United States Patent
Büstgens et al.

(10) Patent No.: US 7,720,265 B2
(45) Date of Patent: May 18, 2010

(54) FINGERPRINT RECOGNITION MODULE HAVING A THIN-FILM STRUCTURE AND COMPRISING RESISTIVE, TEMPERATURE-SENSITIVE ELEMENTS

(75) Inventors: Burkhard Büstgens, Freiburg (DE); Gerald Urban, Freiburg (DE); Joachim Aurich, Koblenz (DE); Günter Igel, Teningen (DE)

(73) Assignee: Inabillion AS, Nesoya (NO)

( * ) Notice: Subject to any disclaimer, the term of this patent is extended or adjusted under 35 U.S.C. 154(b) by 624 days.

(21) Appl. No.: 10/513,331

(22) PCT Filed: May 15, 2003

(86) PCT No.: PCT/DE03/01583
§ 371 (c)(1),
(2), (4) Date: Jul. 24, 2005

(87) PCT Pub. No.: WO03/098535
PCT Pub. Date: Nov. 27, 2003

(65) Prior Publication Data
US 2006/0050935 A1 Mar. 9, 2006

(30) Foreign Application Priority Data
May 17, 2002 (DE) .............................. 102 22 616

(51) Int. Cl.
*G06K 9/00* (2006.01)
(52) U.S. Cl. ....................................... 382/124; 374/141
(58) Field of Classification Search .................. 382/124
See application file for complete search history.

(56) References Cited

U.S. PATENT DOCUMENTS

| | | | | | |
|---|---|---|---|---|---|
| 3,635,085 A | * | 1/1972 | Shimotsuma et al. | ....... | 374/103 |
| 4,251,564 A | * | 2/1981 | Cannella et al. | ................ | 427/1 |
| 4,336,998 A | * | 6/1982 | Ruell | .......................... | 356/71 |
| 4,358,677 A | * | 11/1982 | Ruell et al. | .................. | 250/216 |
| 4,429,413 A | * | 1/1984 | Edwards | ...................... | 382/124 |
| 4,582,985 A | * | 4/1986 | Lofberg | ...................... | 235/380 |
| 4,705,299 A | * | 11/1987 | Hedgcoth et al. | ............. | 283/68 |

(Continued)

FOREIGN PATENT DOCUMENTS

EP 0 791 899 A2 * 8/1997

(Continued)

*Primary Examiner*—Sath V Perungavoor
(74) *Attorney, Agent, or Firm*—Duane Morris LLP

(57) ABSTRACT

The invention relates to a fingerprint recognition module comprising a substrate consisting of a material that is electrically insulating at least on its upper side and at least partially thermally insulating. Said substrate receives a composite of structured thin films on its surface, which directly forms a measuring field on the surface of the substrate for measuring a fingerprint. Said composite consists of an array of resistive, temperature-dependent elements, and contains strip conductors which connect the resistive, temperature-dependent elements to at least one connection field located on the substrate, outside the measuring field, and form part of the composite of structured thin films. The substrate also contains at least one microelectronic switching circuit which is electrically connected to the at least one connection field and contains the switching circuits by which means the thin film structures are controlled in order to heat the resistive, temperature-sensitive elements, the resistive, temperature-sensitive elements are read out, and the data is retransmitted.

19 Claims, 3 Drawing Sheets

U.S. PATENT DOCUMENTS

| | | | |
|---|---|---|---|
| 4,866,276 A | | 9/1989 | Leavens et al. |
| 4,978,230 A | | 12/1990 | Adiutori et al. |
| 5,108,193 A | | 4/1992 | Furubayashi |
| 5,302,022 A | | 4/1994 | Huang et al. |
| 5,864,296 A | * | 1/1999 | Upton ........................ 340/5.53 |
| 5,897,610 A | | 4/1999 | Jensen |
| 5,978,496 A | * | 11/1999 | Harkin ........................ 382/124 |
| 6,011,273 A | * | 1/2000 | Ichikawa et al. ............... 257/57 |
| 6,055,324 A | * | 4/2000 | Fujieda ........................ 382/124 |
| 6,061,464 A | * | 5/2000 | Leger ........................... 382/124 |
| 6,091,837 A | * | 7/2000 | Dinh ............................ 382/124 |
| 6,108,438 A | * | 8/2000 | Bird et al. ................... 382/124 |
| 6,234,031 B1 | * | 5/2001 | Suga ..................... 73/862.474 |
| 6,318,757 B1 | * | 11/2001 | Ritchie et al. ................. 283/75 |
| 6,327,376 B1 | * | 12/2001 | Harkin ........................ 382/124 |
| 6,411,727 B1 | * | 6/2002 | Harkin ........................ 382/124 |
| 6,441,395 B1 | * | 8/2002 | Yu et al. ........................ 257/40 |
| 6,657,358 B2 | * | 12/2003 | Perner ........................ 310/300 |
| 6,888,956 B2 | * | 5/2005 | Muramatsu et al. ......... 382/124 |
| 7,133,541 B2 | * | 11/2006 | Haselsteiner et al. ........ 382/124 |
| 2006/0050935 A1 | * | 3/2006 | Bustgens et al. ............. 382/124 |
| 2008/0063246 A1 | * | 3/2008 | Dinh ........................... 382/124 |

FOREIGN PATENT DOCUMENTS

| | | |
|---|---|---|
| EP | 0 919 947 A2 | 6/1999 |
| FR | 2340547 | 9/1977 |
| WO | 8203286 | 9/1982 |
| WO | WO 99/39394 | 8/1999 |
| WO | WO 99/45496 | 9/1999 |

* cited by examiner

FINGERPRINT RECOGNITION MODULE HAVING A THIN-FILM STRUCTURE AND COMPRISING RESISTIVE, TEMPERATURE-SENSITIVE ELEMENTS

The present invention relates to the identification of persons by means of fingerprint.

Various fingerprint sensors, which are interconnected with external computers to create fingerprint verification systems, are known. The fingerprint sensors themselves are, as a rule, large-area silicon chips (U.S. Pat. No. 9,978,496; U.S. Pat. No. 6,069,970; U.S. Pat. No. 6,091,837), which fill in the large chip surface only inadequately. Present on the entire chip surface, distributed between the individual pixels, are unutilized portions of surface. Because the chip costs are determined essentially only by the chip surface, these costs are unnecessarily high in the case of the fingerprint sensors mentioned. The utilization of the unutilized portions of the surface—for example, for a microprocessor that performs a fingerprint verification—fails owing to the necessity of breaking up the free portions of the surface for this into small areas. The sensors described also have the drawback that they are tied to silicon as construction material and may therefore be applied only with difficulties in many applications, such as, for example, in flexible smart cards. In all cases, the sensitive silicon chip is exposed directly to the surroundings. Fragility of the chip and sensitivity of the surfaces toward impact afford only inadequate lifetimes in spite of all coatings.

The problem of the invention is to produce at low cost a fingerprint recognition module with a large fingerprint measuring field, which may be integrated simply into different devices and surroundings, without the surface of a microchip being exposed directly to the contact of a finger or other influences of the surroundings. In addition, the construction in accordance with the invention should allow the integration of a large-area fingerprint measuring field into a flexible smart card. For this, the sensor itself has to be adequately flexible, while, at the same time, having a surface that can withstand high mechanical loads.

The problem is solved in that the fingerprint recognition module comprises
- a substrate,
- a composite of structured thin films of the surface of (he substrate,
  - which forms a measuring field on a portion of the substrate for measuring a fingerprint, consisting of resistive, temperature-sensitive elements arranged in rows and columns, and
  - which contains thin-film structures for heating the resistive, temperature-sensitive elements, and
  - which contains strip conductors, which connect the resistive, temperature-dependent elements with at least one connection field located on the substrate outside of the measuring field,
- at least one microelectronic analyzing switching circuit, which is electrically connected with the at least one connection field and contains the switching circuit with which the thin-film structures for heating the resistive, temperature-sensitive elements are controlled, the resistive, temperature-sensitive elements are read out, and data are relayed.

The invention has the set goal of realizing robust and inexpensively produced, exclusively passive, temperature-sensitive elements for the realization of a thermal fingerprint sensor on any, not necessarily semiconductive substrates. Hereby solved, in the framework of the invention, besides a suitable layer structure, are, in particular, also the problems of control/readout of the passive thermal sensor field, consisting of, for example, 200×300 resistive elements at a resolution of, for example, 500 dpi, by peripheral control electronics, taking into consideration the complex requirements imposed on the thermal measuring process. A suitable principle of measurement is described in U.S. Pat. No. 6,091,837. However, the arrangement of electrical circuitry depicted in FIG. 5 in U.S. Pat. No. 6,091,837 is fundamentally not transferable to a purely passive sensor array. The nearly linear response curve of the passive elements leads to a strong mutual interaction of the individual elements in the array and thus to electrical impairment of the electrical measuring effect. The readout principle of the invention solves this partial problem. Furthermore, the principle of measurement of U.S. Pat. No. 6,091,837 necessitates the incorporation of a heating power into the individual pixels through the use of, as a rule, heating elements. The heating power has to be supplied through strip conductors as uniformly and with as little loss as possible. The kind of heating of the elements depicted in FIG. 5 in U.S. Pat. No. 6,091,837 through a parallel arrangement of heating elements fails in a thin-layer composite, because the cumulative heating power of all heating elements has to be supplied through common thin-film strip conductors for the following reason: Because the strip conductors that connect the pixels and transmit power always have a high thermal conductivity for low resistivity (high layer thickness), the thermal contrast between the pixels and thus the measurement contrast would be too strongly impaired. A reduction of the layer thickness of these strip conductors in such a way that, on the one hand, the thermal contrast between the pixels is adequate and, on the other hand, the heating power is supplied with an adequately low loss does not lead to any practical solution for a high-solution array. The consequence is that, depending on the lead paths, that is, depending on the position of the heating element under consideration in the array, the delivered heating power varies strongly.

The invention solves this problem and solves, even for optional heating of individual columns, the problem of limiting the number of conductor leads out of the measuring field to essentially the number of rows plus the number of columns by undertaking the heating of each column by an additional heating conductor, which is located within the thin-layer composite above or below the resistive, temperature-dependent elements, its top end being electrically connected with the strip conductor that forms the respective column lead of the resistive, temperature-dependent elements, and its bottom end being connected with the bottom ends of further heating conductors, which heat further columns.

The invention allows the integration of a large fingerprint measuring field having an integrated passive sensor system directly on very, diverse, non-semiconductive substrate materials, which can be selected depending on the mechanical requirements of the area of application—for example, plastic films, metal foils, or laminates for use in flexible smart cards. In accordance with the invention, the thin layers applied are selected to be appreciably harder than the underlying portion of the substrate, so that, similarly to human skin, when point loads occur, the deformation is transmitted to the underlying, more elastic substrate layer. A reduction of localized peaks in force is thus achieved. At the sane time, the high mechanical strength of the thin-layer composite prevents it from being plastically deformed (destroyed).

In addition to the mechanical advantages, cost advantages ensue from the invention: The entire field control and additional computing intelligence for the verification operation can be integrated into the microchip introduced peripherally to the measuring field. In accordance with the present state of the art, the size of the microchip can be kept small in comparison to the substrate and to the sensor field itself, this resulting in a lower chip price. The thin-layer composite itself can be produced by using a large-area, cost-effective technology, with far lower area-related costs than for a microchip.

Figure 1:
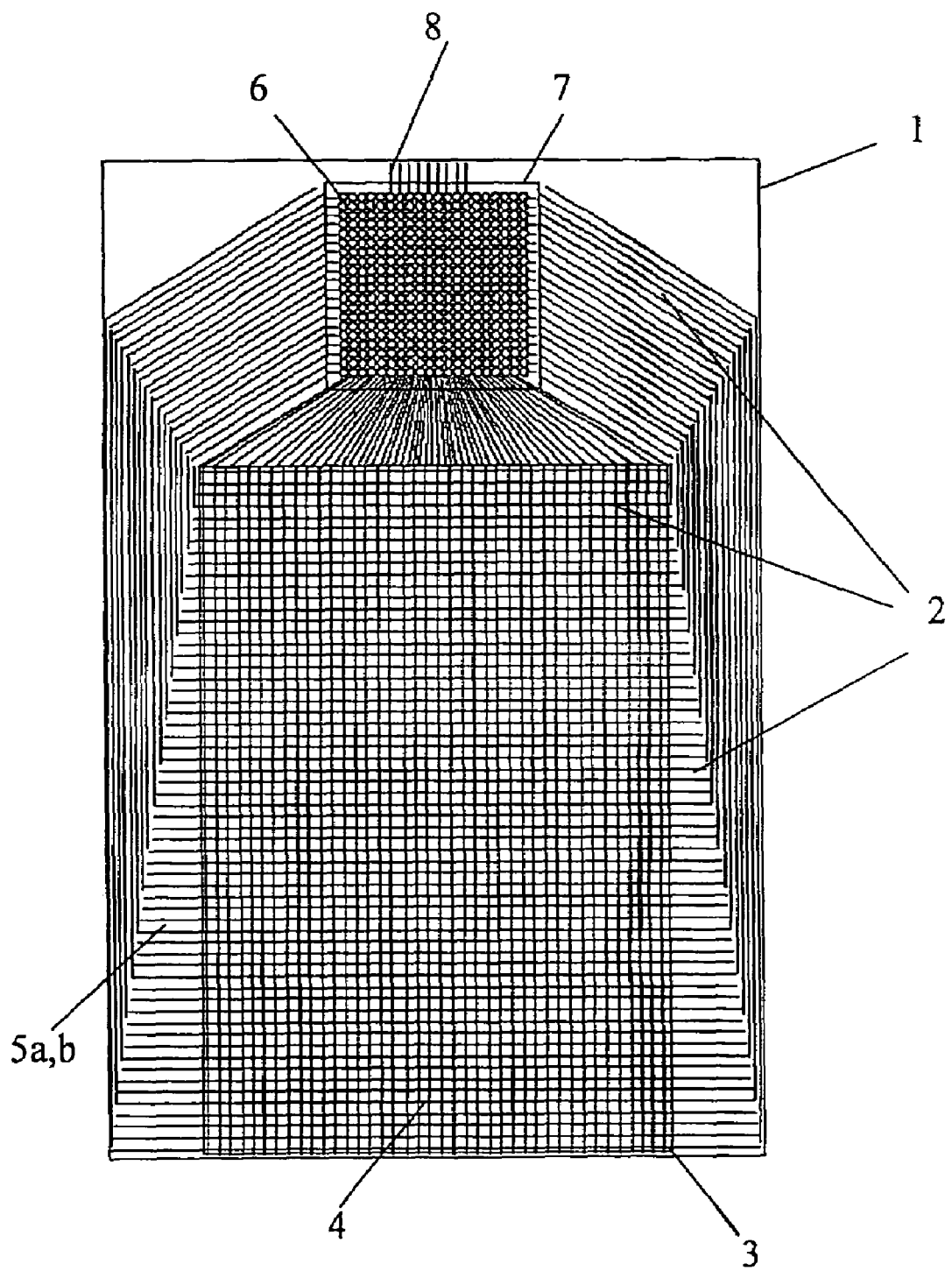
FIG. 1 shows a general view of the fingerprint recognition module.

WITH THE FOLLOWING NUMBERING 1 finger print recognition module
2 composite of structured thin films
3 measuring field
4 resistive, temperature-dependent elements
5a,b first metal layer, second metal layer
6 connection field
7 microelectronic analyzing switching circuit
8 lead contacts
9 electrically and thermally insulating layer
10 substrate plate, substrate foil
11 heating conductor
12 switch
13 virtual mass
14 OA (operational amplifier)
15 operating voltage
16 contact
17 insulating layer
18 contact window
19 end layer/screening/sensor mass
20 row strip conductor
21 column strip conductor
22 splitting of heating conductors and column strip conductor
23 switch for heating FIG. 1 shows a fingerprint recognition module in a general view from above. The substrate 1 forms the basis for the construction of the module and need not have any special semiconductive properties. Crucial for the thermal functional principle of the fingerprint sensor used is that a layer with thermal insulating effect is involved at least for the portion of the substrate located under the measuring field 3. This can be achieved by a suitable selection of material—for example, glass, polymers, and the like—and a relevant thickness of about 1000 nm to several 100,000 nm. In practical terms, the entire substrate consists of a thermally well-insulating material, such as, for example, glass or polymer. Also advantageous is a laminate consisting of a plate or foil 10, made of metal, ceramic, or the like, together with a polymer 9, such as, for example, a polyimide or an epoxide, as substrate surface, the metal plate or metal foil, for example, imparting a high tensile strength to the module and also minimizing any warping during the fabrication operation. Suitable are, among other things, the flexible printed circuit boards, referred to as Flexprint, which, in this case, however, are finished on their back side. Here, it may be appropriate, in order to reduce roughness, to apply a thin and non-conductive planarizing layer, which at least covers up any unevenness, before the composite of thin layers 2 is applied. At the end of the fabrication process, the metal plate or metal foil can, if necessary, be entirely or partially etched away.

Applied additively to the electrically/thermally insulating side of the substrate, possibly after planarization has occurred, is a composite of thin films 2, which, in the totality thereof, is about 300 nm to 5000 nm thick and which has functional properties for fingerprint recording: strip conductors made of metal layers 5—for example, Ti/Au or Ti/Al—serve for signal transmission and power transmission between the sensor elements and contact field 6 and the analyzing switching circuit 7. Because of the many connection pads, the contact field 6 is best designed in array form. Additional strip conductors 8 connect the analyzing switching circuit 7 via the contact field 6 to other components (not depicted) or to a power/data interface. The strip conductors can be produced here through known processes of thin-film structuring, possibly supplemented by galvanic or other layer construction processes.

The construction of the fingerprint measuring field is that of an array comprising resistive, temperature-dependent elements 4, which are arranged in rows and columns. These are addressed through row strip conductors 20 and column strip conductors 21, which represent a continuation of the strip conductors 5 into the measuring field, in that every resistive, temperature-sensitive element 4 is connected to one row strip conductor and one column strip conductor each; see also FIG. 4. In connection with a separation of measuring field and readout electronics, it is especially advantageous to use resistive, temperature-sensitive elements 4 having high resistance, so that, even for small layer thicknesses, the resistance of the lead connections is small in comparison with the resistance of the resistive, temperature-sensitive elements. Also in terms of a small power consumption for the measuring operation, it is advantageous that the individual resistive, temperature-sensitive elements have resistance values in the range of 100 kOhm to several megaohm. Suitable are, for example, resistive, temperature-sensitive elements made of Ge, SiC, $VO_x$, or YBaCuO with high temperature coefficients.

Figure 2:
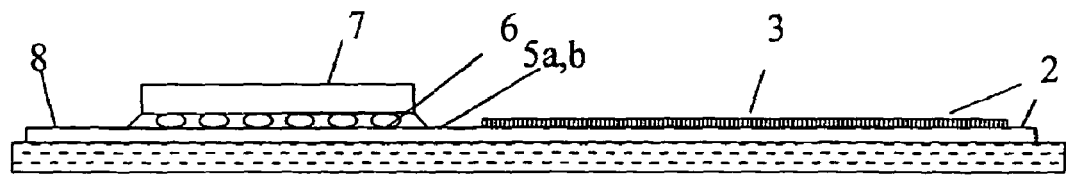
FIG. 2 shows a general sectional view of the fingerprint recognition module.

FIG. 2 shows a cross section through the fingerprint recognition module. Visible here is the electrical contact of the microelectronic analyzing switching circuit 7 with the contact field 6. Various flip chip technologies are available for this purpose—for example, solder bumps, polymer FC, or ACF (anisotropic conducting films), which are part of prior art. The substrate is constructed of glass by way of example in FIG. 2.

Figure 3:
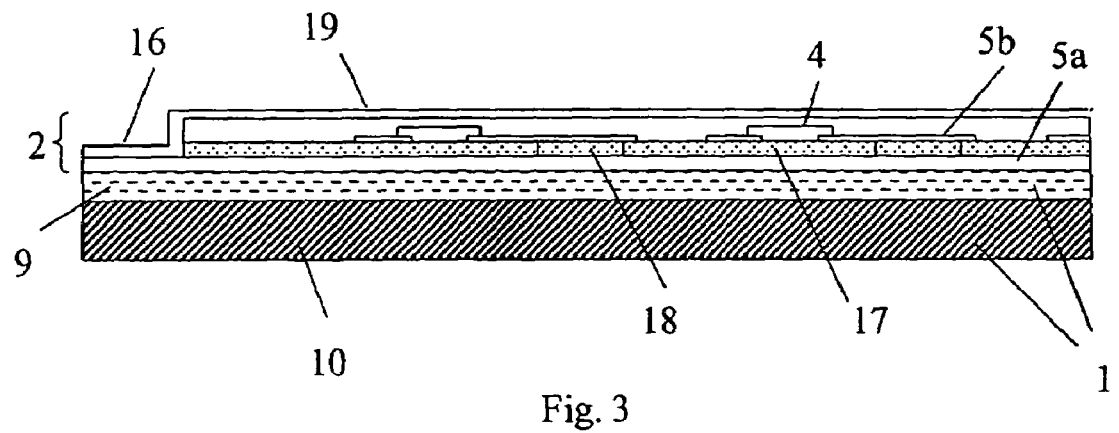
FIG. 3 shows a sectional view through the measuring field in a simple construction with heating conductors directly below the resistive, temperature-sensitive elements.

FIG. 3 show a cross section through the measuring field of the fingerprint recognition module. On the substrate 1, which here, for example, is constructed as a laminate comprising a metal foil 10 and a Kapton film 9, which was planarized by a thin, additional polyimide layer (not depicted), first a metal layer 5a, which, for example, contains the column strip conductors 21 and/or the heating conductors 11, is applied.

The column strip conductors 21 and the heating conductors 11 can also be realized in different conductive layers, which are separated by insulating layers 17. This is appropriate when, for example, transparent ITO layers are going to be used for the row strip conductors 20 and the column strip conductors 21 and the heating conductors are not of adequate low resistivity. The insulating layers are made, for example, of $SiO_2$, $SiN_x$, polyimide, or epoxide and contain contact windows 18. The actual resistive, temperature-sensitive elements 4 are connected through the contact windows 18 directly or indirectly, via a short piece of strip conductor of the second metal layer 5b, with a column strip conductor of the first contact layer 5a.

The second metal layer contains row leads 20, which finally electrically connect the resistive, temperature-sensitive elements 4 with the contact field 6.

The composite of thin layers 2 is concluded by one or several passivating layers. A passivating layer consists, depending on the passivation requirements of the temperature-sensitive materials, of $SiO_2$, $SiN_x$, epoxide, or polyimide.

Especially advantageous is a number of respects is the following application of a thin metal layer 19. If the latter is placed in a suitable way at the reference potential of the sensor, it can protect the resistive, temperature-sensitive elements 4 and the microelectronic switching against electromagnetic interference and discharges. Furthermore, it offers protection against mechanical loads. In addition, it can be employed also as electrical conductor for signal/power transmission (see below) and/or even for heating.

A further improvement of the mechanical resistance may be achieved by the application of a typical hard surface layer, such as, for example, SiC, WoC, or similar materials.

A further optional layer can be a specially abrasion-reducing layer, which prevents especially damaging shearing strains from being imposed on the surface.

The danger of the known shadow image of the last-measured fingerprint due to residually adhering grease/sweat can be countered by a poorly wettable surface coating in the form of, for example, a Lotus effect coating.

Figure 4:
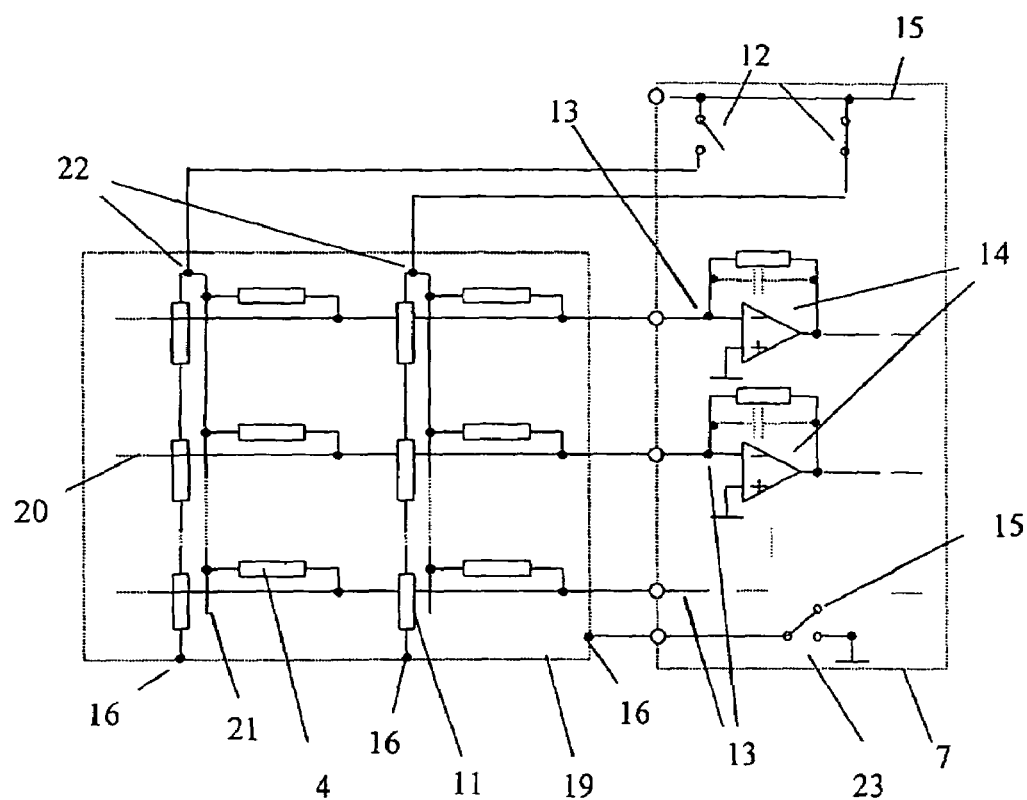
FIG. 4 shows a circuitry diagram for illustration of the electrical interconnections.

FIG. 4 shows a circuitry diagram for illustration of the electrical structure. The measuring field 3 and the electronic analyzing switching circuit 7 are each outlined here by dotted lines. In the variant selected, each resistive, temperature-dependent element 4 is connected with one row strip conductor 20 and one column strip conductor 21 for addressing. The selected elements are highly resistive faith approximately 1 MOhm and therefore allow a low-current, parallel readout of an entire column.

For the readout operation, it is crucial that all row connections 13 lie at the same electrical potential. If this is not the case, then the readout of the individual elements will be interfered with through diverse current paths via neighboring elements and the sensitivity of the individual elements will be degraded. In accordance with the invention, a current measurement at the same potential is performed at the points 13, while, through the switch 12, a measuring voltage 15 is applied in a column-selective manner. Realized by way of schematic example in FIG. 4 is the adjustment of the same column voltages through the inverting operational amplifier (OA) 14, which creates a virtual zero point at each of the points 13 and has, in general, a complex feedback impedance. Because several solution variants are available for this problem, it is merely pointed out here that the switching has to be capable of eliminating differences in potential between the individual row leads. In connection with the nomenclature in this disclosure, it is pointed out here that the terms rows and columns are interchangeable.

In the variant depicted in FIG. 4, the heating occurs by column through heating conductors 11, which are located in an electrically insulated manner geometrically directly below and above the sensitive elements. They are connected at their top end with the column strip conductors 21 at one point 22 each. Thus, from this point to the switch 12, only a single conductor is required for heating and addressing the pixels, so that the number of column leads corresponds overall only to the simple number of columns. At the bottom end, the heating conductors of the columns are connected with one another.

In the general case, the heating conductors 11 can span the elements of several columns, so that the elements of several columns are heated at the same time. In this case, the heating conductors 11 are connected, at their top end, with only one column strip conductor 21; they can also be connected discretely, although this opposes the saving of leads. At their bottom end, as shown in FIG. 4, all heating conductors or groups of heating conductors are combined into junctions. In this cash additional leads have to be taken into account through finer groupings. Through the optional use of one switch 23 for each junction, the heating function can be switched on and off, this making it possible to realize different kinds of operation such as, for example, the following operating mode: measure n columns—heat n columns—measure n columns.

Especially advantageous, as depicted in FIG. 4, is the use or incorporation of the surface metal layer 19 for return of the heat flow. Present for this purpose are through-hole contacts 16 through the passivating layer, on the one hand, at each bottom end of the heating conductors 11 or of the conductive region connecting these and, on the other hand, in the vicinity of the microelectronic switching circuit on one or several of the metal layers, which are connected with the contact field; see also FIG. 3.

Figure 5:
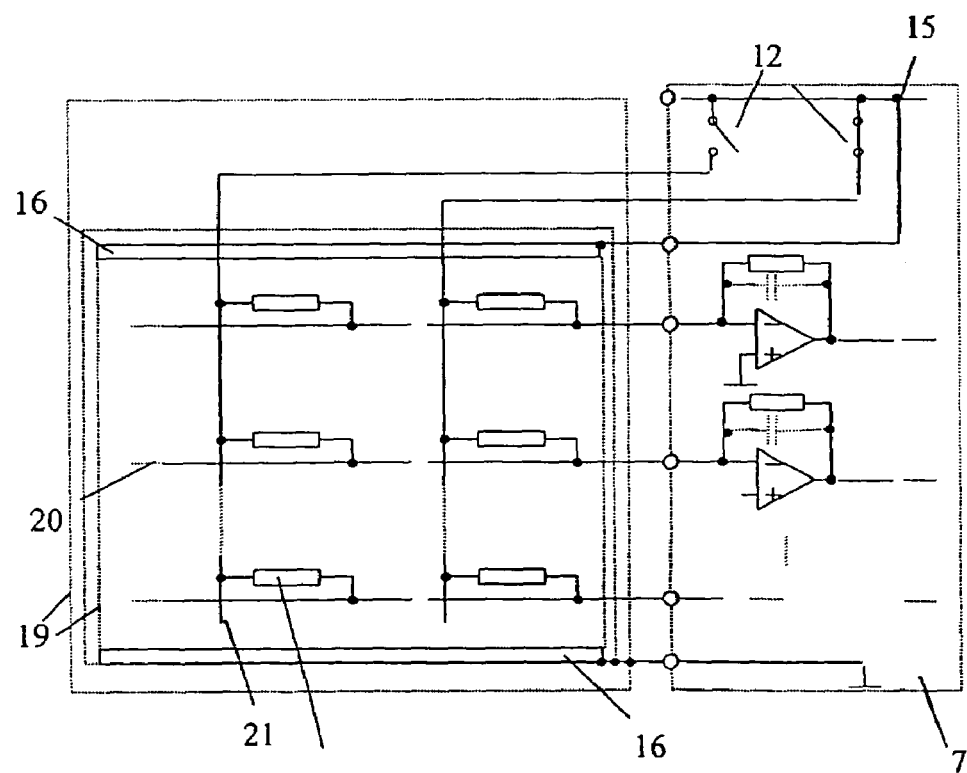
FIG. 5 shows an advantageous layout variant for heating by means of an electrically conductive end layer.

Depicted in FIG. 5 is a possibility for heating the arrays directly by means of the surface metal layer 19. In this case, the latter is designed to be very thin, far less than 100 nm, possibly transparent. In this variant, the heating conductors 11 can be dispensed with and thus also do not contribute to the dissipation of heat between the pixels. The small thickness of the surface metal layer 19 causes only a small lateral heat spread, thereby making possible a high contrast. The surface metal layer 19 is contacted by means of the through-hole contacts 16 on one or several of the strip conductors. For the variant in FIG. 5, the surface metal layer 19 is structured through the interruptions in such a way that the evolution of heat is restricted to the measuring field. The remainder of the substrate outside of the connection field is covered and grounded as fully as possible with regions of the surface metal layer 19. The variant in FIG. 5 further allows the use of a less conductive, transparent ITO (indium tin oxide) layer in place of the metallic surface layer 19 for heating.

The microelectronic analyzing switching circuit 7 can contain in addition to the control function and readout function for the fingerprint measuring field, further functions: In the example of the fingerprint verification module, the integration of a processor is appropriate, this processor performing the verification in whole or in part. Besides volatile memories for execution of the process steps the processor contains nonvolatile memories for program code or else for saving the fingerprint template(s). In many applications, it may be appropriate to file the fingerprint template once in nonvolatile memory. In this way subsequent manipulation of the databases is countered.

In addition for the microelectronic analyzing switching circuit 7 mentioned further switching circuits can be applied to the substrate. This can be of advantage to design the conductor paths of the strip conductors 5 more favorably when the chip size is to remain small or when it seems appropriate to use different chip technologies for diverse functionalities.

The invention claimed is:

1. A fingerprint recognition module comprising:
   a substrate,
   a composite of structured thin films on the surface of the substrate, that forms a measuring field on a portion of the substrate for measuring a fingerprint, including linear, resistive, temperature-sensitive elements arranged in rows and columns, and that contains thin-film structures for heating the linear, resistive, temperature-sensitive elements, and that contains strip conductors, connecting the linear, resistive, temperature-sensitive elements with a connection field located on the substrate outside of the measuring field, and a microelectronic analyzing switching circuit, electrically connected with the connection field and containing a switching circuit with which the thin-film structures for heating the linear, resistive, temperature-sensitive elements are controlled, the linear, resistive, temperature-sensitive elements are read out, and data are relayed, wherein the thin-film structures for heating comprise a plurality of sets of series connected longitudinal heating conductors, each set of series connected longitudinal heating conductors being situated under or above the resistive, temperature-sensitive elements of at least one respective column of resistive, temperature-sensitive elements in such a way that, when current flows through the series connected longitudinal heating conductors of the set, the longitudinal heating conductors of that set heat, at the same time, the resistive, temperature-sensitive elements of the at least one respective column.

2. The fingerprint recognition module according to claim 1, wherein the microelectronic analyzing switching circuit contains a process computer, including computing and memory storage units, that, by means of software, verify the measured fingerprint in relation to one or several stored fingerprints.

3. The fingerprint recognition module according to claim 1, wherein the substrate includes glass.

4. The fingerprint recognition module according to claim 1, wherein the portion of the substrate adjoining the composite of structured thin films is elastic in comparison to the composite of structured thin films.

5. The fingerprint recognition module according to claim 1, wherein the portion of the substrate adjoining the composite of structured thin films has a thermally insulating effect.

6. The fingerprint recognition module according to claim 1, wherein the substrate includes rigid or flexible plastic.

7. The fingerprint recognition module according to claim 1, wherein the portion of the substrate adjoining the composite of structured thin films includes plastic.

8. The fingerprint recognition module according to claim 1, wherein the strip conductors comprise row conductor strips and column conductor strips and wherein each set of longitudinal heating conductors is connected at its one end with a column lead of exactly one column conductor strip and at its other end with the other end of further sets of longitudinal heating conductors in the form of a switching junction.

9. The fingerprint recognition module according to claim 8 wherein the switching junction is connected with an electric switching element, contained in the microelectronic analyzing switching circuit, by means of which the heating function can be switched.

10. The fingerprint recognition module according to claim 1, further comprising a surface layer made of electrically conductive material that is grounded.

11. The fingerprint recognition module according to claim 1, wherein the thin-film composite is coated in whole or in part with a poorly wetting surface layer or with a layer with Lotus effect.

12. The fingerprint recognition module according to claim 1, wherein the thin-film composite is coated in whole or in part with a surface abrasion-reducing layer.

13. A fingerprint recognition module comprising:
a substrate
a composite of structured thin films on the surface of the substrate, that forms a measuring field on a portion of the substrate for measuring a fingerprint, including linear, resistive, temperature-sensitive elements arranged in rows and columns, and that contains thin-film structures for heating the linear, resistive, temperature-sensitive elements, and that contains strip conductors, connecting the linear, resistive, temperature-sensitive elements with a connection field located on the substrate outside of the measuring field, and a microelectronic analyzing switching circuit, electrically connected with the connection field and containing a switching circuit with which the thin-film structures for heating the linear, resistive, temperature-sensitive elements are controlled, the linear, resistive, temperature-sensitive elements are read out, and data are relayed, wherein the strip conductors comprise row conductor strips and column conductor strips and wherein the microelectronic analyzing switching circuit holds the electrical potential of all row conductor strips at the same value.

14. A fingerprint recognition module comprising:
a substrate
a composite of structured thin films on the surface of the substrate, that forms a measuring field on a portion of the substrate for measuring a fingerprint, including linear, resistive, temperature-sensitive elements arranged in rows and columns, and that contains thin-film structures for heating the linear, resistive, temperature-sensitive elements, and that, contains strip conductors, connecting the linear, resistive, temperature-sensitive elements with a connection field located on the substrate outside of the measuring field, and a microelectronic analyzing switching circuit, electrically connected with the connection field and containing a switching circuit with which the thin-film structures for heating the linear, resistive, temperature-sensitive elements are controlled, the linear, resistive, temperature-sensitive elements are read out, and data are relayed, wherein the substrate includes a metal-plastic laminate and the plastic side of the laminate is coextensive with and disposed over the metal side of the laminate and serves as a substrate surface on which the composite of structured thin films is provided.

15. A fingerprint recognition module comprising:
a substrate,
a composite of structured thin films on the surface of the substrate, that forms a measuring field on a portion of the substrate for measuring a fingerprint, including linear, resistive, temperature-sensitive elements arranged in rows and columns, and that contains thin-film structures for heating the linear, resistive, temperature-sensitive elements, and that contains strip conductors, connecting the linear, resistive, temperature-sensitive elements with a connection field located on the substrate outside of the measuring field, a microelectronic analyzing switching circuit, electrically connected with the connection field and containing a switching circuit with which the thin-film structures for heating the linear, resistive, temperature-sensitive elements are controlled, the linear, resistive, temperature-sensitive elements are read out, and data are relayed, and a surface layer made of electrically conductive material, wherein an electric circuit comprising the thin-film structures for heating the resistive, temperature-sensitive elements is electrically closed via the surface layer made of electrically conductive material.

16. A fingerprint recognition module comprising:
a substrate,
a composite of structured thin films on the surface of the substrate, that forms a measuring field on a portion of the substrate for measuring a fingerprint, including linear, resistive, temperature-sensitive elements arranged in rows and columns, and that contains thin-film structures for heating the linear, resistive, temperature-sensitive elements, and that contains strip conductors, connecting the linear, resistive, temperature-sensitive elements with a connection field located on the substrate outside of the measuring field, and
a microelectronic analyzing switching circuit, electrically connected with the connection field and containing a switching circuit with which the thin-film structures for heating the linear, resistive, temperature-sensitive elements are controlled, the linear, resistive, temperature-sensitive elements are read out, and data are relayed,
wherein the thin-film structures for heating the resistive, temperature-sensitive elements are constructed as a surface layer made of electrically conductive material.

17. The fingerprint recognition module according to claim 16, wherein the surface layer includes transparent, electrically conductive material.

18. A fingerprint recognition module comprising:
a substrate,
a composite of structured thin films on the surface of the substrate, that forms a measuring field on a portion of the substrate for measuring a fingerprint, including linear, resistive, temperature-sensitive elements arranged in rows and columns, and that contains thin-film structures for heating the linear, resistive, temperature-sensitive elements, and that contains strip conductors, connecting the linear, resistive, temperature-sensitive elements with a connection field located on the substrate outside of the measuring field, and
a microelectronic analyzing switching circuit, electrically connected with the connection field and containing a switching circuit with which the thin-film structures for heating the linear, resistive, temperature-sensitive elements are controlled, the linear, resistive, temperature-sensitive elements are read out, and data are relayed,
wherein the microelectronic analyzing switching circuit is flip chip mounted over the substrate to make electrical connection with the connection field.

19. The fingerprint recognition module of claim 18, wherein the microelectronic analyzing switching circuit is mounted over a portion of the connection field.

* * * * *

UNITED STATES PATENT AND TRADEMARK OFFICE
CERTIFICATE OF CORRECTION

PATENT NO. : 7,720,265 B2
APPLICATION NO. : 10/513331
DATED : May 18, 2010
INVENTOR(S) : Burkhard Büstgens et al.

It is certified that error appears in the above-identified patent and that said Letters Patent is hereby corrected as shown below:

Column 7, line 64, insert --,-- after the word "substrate"

Column 8, line 21, insert --,-- after the word "substrate"

Column 8, line 28, delete "," after the word "that"

Signed and Sealed this

Twenty-seventh Day of July, 2010

David J. Kappos
*Director of the United States Patent and Trademark Office*